(12) United States Patent
Cai et al.

(10) Patent No.: US 10,210,429 B2
(45) Date of Patent: Feb. 19, 2019

(54) IMAGE BASED PREDICTION OF USER DEMOGRAPHICS

(71) Applicant: Facebook, Inc., Menlo Park, CA (US)

(72) Inventors: Chaochao Cai, Bellevue, WA (US); Goran Predovic, Redmond, WA (US); Wei Wei, Fremont, CA (US); Chang Liu, Foster City, CA (US); Liang Xu, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 16 days.

(21) Appl. No.: 15/497,866

(22) Filed: Apr. 26, 2017

(65) Prior Publication Data

US 2018/0314915 A1    Nov. 1, 2018

(51) Int. Cl.
| | |
|---|---|
| *G06K 9/62* | (2006.01) |
| *G06N 99/00* | (2010.01) |
| *G06N 5/04* | (2006.01) |
| *G06K 9/00* | (2006.01) |
| *G06K 9/66* | (2006.01) |
| *G06K 9/72* | (2006.01) |

(52) U.S. Cl.
CPC ....... *G06K 9/6256* (2013.01); *G06K 9/00275* (2013.01); *G06K 9/66* (2013.01); *G06K 9/72* (2013.01); *G06N 5/04* (2013.01); *G06N 99/005* (2013.01); *G06K 2009/00322* (2013.01); *G06K 2009/00328* (2013.01)

(58) Field of Classification Search
None
See application file for complete search history.

(56) References Cited

U.S. PATENT DOCUMENTS

| | | | |
|---|---|---|---|
| 2010/0312820 A1* | 12/2010 | Goffinet | G06Q 30/02 709/203 |
| 2012/0209795 A1* | 8/2012 | Glickman | G06Q 30/0201 706/12 |
| 2017/0186044 A1* | 6/2017 | Tal-Israel | G06F 17/30256 |

* cited by examiner

*Primary Examiner* — Delomia L Gilliard
(74) *Attorney, Agent, or Firm* — Fenwick & West LLP (57) ABSTRACT

An online system predicts gender, age, interests, or other demographic information of a user based on image data of the user, e.g., profile photos, photos the user posts of him/herself within an online system, and photos of the user posted by other users socially connected with the user, and textual data in the user's profile that suggests age or gender (e.g., like or dislikes similar to a population of users of an online system). The online system similarly predicts a user's interests based on the photos of the user. The online system applies one or more models trained using deep learning techniques to generate the predictions. The online system uses the predictions to build more information about the user in the online system, and provide improved and targeted content delivery to the user that may have disparate information scattered throughout different online systems.

19 Claims, 5 Drawing Sheets

IMAGE BASED PREDICTION OF USER DEMOGRAPHICS

BACKGROUND

This disclosure generally relates to online systems, and more specifically to predictions of demographics of a user, e.g., age, gender, and interests, based on image data associated with the user from one or more online systems.

Content providers produce content that is targeted to certain audiences within online systems. Users interact with content received from the online systems. With the advent of online systems such as social networking systems, content providers have increasingly relied on the online systems to create effective sponsored content within the online systems to greatly increase engagement among users of the online systems. With the increasing number of available online systems, users may be individually registered across a wide number of online systems. Each time the user registers with an online system, the user has a new user profile that may be unique to that particular online system. Users may use each online system for different purposes. For example, a user may primarily utilize a first online system as a social online network, and utilize a second online system for visual storytelling or a professional online network. Thus, users may provide different information (e.g., different profile photos) in their user profile on each respective online system.

Online systems often utilize the information provided by a user in the user profile for a variety of purposes. For example, online systems may desire to deliver content items that are tailored for a user based on the user's interests and/or characteristics that are listed in the user's profile. However, given that a user may only choose to provide a portion of his/her characteristics or interests to any one online system, each online system may not have a full understanding of the user. This leads to inefficiencies, e.g., failure to have a comprehensive understanding of a user's interests, especially in the context of content delivery where the lack of a comprehensive profile of the user may lead to the delivery of content that is poorly tailored to the user.

SUMMARY

An online system predicts gender, age, interests, or other demographic information of a user based on image data of the user. Examples of image data of a user include profile photos of the user, e.g., profile photos of the same user on different online systems, e.g., FACEBOOK™ and INSTAGRAM™. The image data of the user may also include photos posted by other users who are socially connected with the user that are viewed, commented on or shared by the user. The online system predicts a user's gender and age based on photos of the user and textual data in the user's profile that suggests age or gender (e.g., like or dislikes similar to a population of known users of an online system). The online system similarly predicts a user's interests based on the photos of the user, e.g., photos posted by the user that show a sport the user is playing, and textual data about the user, e.g., profile data of the user indicating a personal interest.

In both predictions of age/gender and interests, the online system applies one or more models trained using deep learning techniques to generate the predictions, e.g., a trained image model for analyzing image data, a trained text model for analyzing text data, and a trained prediction model for predicting age/gender and interests of a user based on the image data analysis and text data analysis. The online system uses the predictions to build more information about the user in the online system, e.g., by sharing predicted demographic information of a user across multiple online systems and generating a comprehensive profile of the user. The predictions are useful for improved and targeted content delivery to a user that may have disparate information scattered throughout different online systems.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
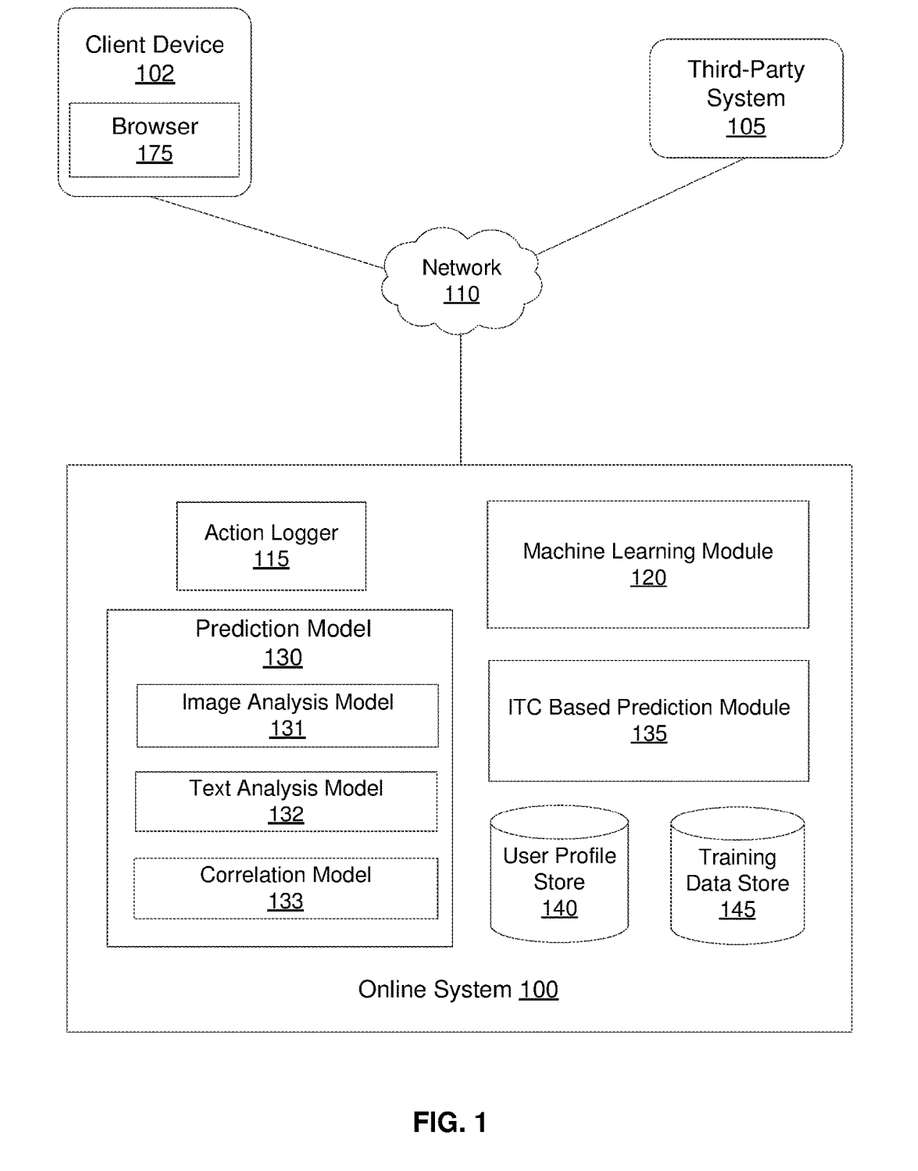
FIG. 1 is a system environment for predicting demographics of a user based on image data and text data associated with the user, in accordance with an embodiment.

FIG. 1 is a system environment for predicting demographics of a user based on image data and text data associated with the user, in accordance with an embodiment. In the embodiment shown in FIG. 1, the system environment includes a client device 102 operated by a user of an online system 100, a third party system 105, and the online system 100. The client device 102, the third party system 105, and the online system 100 communicate with one another through a network 110. While FIG. 1 shows one client device 102 for simplicity, each with a browser 175, one online system 100, and one third party system 105, it should be appreciated that any number of these entities may be included in the system environment. In alternative configurations, different and/or additional entities may also be included in the system environment. In some embodiments, the online system 100 is a social networking system, and the third party system 105 is a visual storytelling system such as an INSTAGRAM™ system, or a partner system of the online system 100. One or more of the third party systems 105 can also be social networking systems.

A client device 102 is a computing device capable of receiving user input through a browser 175, as well as transmitting and/or receiving data via the network 110. Examples of client devices 102 include desktop computers, laptop computers, tablet computers (pads), mobile phones, personal digital assistants (PDAs), gaming devices, or any other electronic device including computing functionality and data communication capabilities. A user of the client device 102 can login to the online system 100 and interact with web pages provided by the online system 100 or the third party system 105. As one example, a user may access a web page of a third party system 105 through the browser 175 of a client device 102 and make a purchase for a product. Similarly, a user of the client device 102 can login to the third party system 105 to share content with other users connected to him/her in the third party system and in the first online system 100. Additionally, the client device 102 may have a device identifier that uniquely identifies the client device 102.

The network 110 facilitates communications among one or more client devices 102, the online system 100, and the third party system 105. The network 110 may be any wired or wireless local area network (LAN) and/or wide area network (WAN), such as an intranet, an extranet, or the Internet. In various embodiments, the network 110 uses standard communication technologies and/or protocols. Examples of technologies used by the network 110 include Ethernet, 802.11, 3G, 4G, 802.16, or any other suitable communication technology. The network 110 may use wireless, wired, or a combination of wireless and wired communication technologies. Examples of protocols used by the network 110 include transmission control protocol/Internet protocol (TCP/IP), hypertext transport protocol (HTTP), simple mail transfer protocol (SMTP), file transfer protocol (TCP), or any other suitable communication protocol.

In one embodiment, the third party system 105 represents another online system that can be separate from the online system 100 in that the two online systems may not otherwise share user demographics. For example, the online system 100 and the third party system 105 are in separate domains but have certain management connections of their operations. In one embodiment, the third party system 105 is an INSTAGRAM™ system, which allows users to share pictures and videos either publically or privately within the system, as well as through other online systems such as the online system 100. A user can login using a specific ID belonging to the user on the third party system 105 (e.g. INSTAGRAM ID). Users of the third party system 105 can upload photos and videos to the third party system 105, follow other users' news feeds, and tag uploaded images with geolocation information (e.g., longitude and latitude coordinates, and/or the name of a location).

The third party system 105 may maintain user profiles in a user profile store, each user profile identified by a user identity (e.g. INSTAGRAM ID) and associated with a user of the third party system 105. A user profile of a user of the third party system 105 may include declarative information about the user that was explicitly shared by the user and may also include profile information inferred by the third party system 105. In one embodiment, a user profile includes multiple data fields, each describing one or more attributes of the corresponding user of the third party system. Examples of information stored in a user profile include biographic, demographic, and other types of descriptive information, such as work experience, educational history, age, gender, hobbies or preferences, location and the like. A user profile may also store other information provided by the user, for example, profile images. In certain embodiments, a profile image of a user may be tagged with identification information of the user of the third party system 105 displayed in an image. The user profile store associated with the third party system 105 further stores data describing one or more relationships between different users and allows users to specify their relationships with other users within the third party system 105.

In another embodiment, the third party system 105 represents any external system outside of the online system 100. For example, the third party system 105 may be a third party retailer that sells products of interest to users of the online system 100. In some embodiments, the two systems are completely independent and without any ownership or management connection. The third party system 105 is responsible for providing data to a user. For example, the third party system 105 provides web page interfaces (e.g. online shopping cart page) for a user to make an online purchase for a product. The user can login using a specific ID belonging to the user on the partner system (e.g. partner system user ID). Additionally, the user may provide personally identifiable information (PII), such as PII that might be provided in a purchase process or during registration as a user of the online system 100. Both the specific ID identifying the user on the partner system as well as the PII information provided by the user may be stored by the third party system 105 in a database of the third party system 105, as a cookie on the user's browser 175, among other locations.

The online system 100 can receive the user identification information in various ways and from various online systems separate/external to the online system 100, e.g. the third party system 105. These separate/external systems can directly send the text data, e.g., the textual description of user profiles, and image data, e.g., profile photos of user profiles, to the online system 100, or the online system 100 may receive them via other sources, such as via cookies, via tracking pixels on web pages associated with the third party system 105, or from mobile applications associated with the third party system 105.

In some embodiments, the online system 100 receives identification information of a user and information about the behavior of the user on various web pages of the third party system 105 using a tracking pixel that the third party system 105 places on the web pages. For example, a user searches for flights to Vienna, Austria on a web page domain hosted by the third party system 105. In one embodiment, the tracking pixel is a segment of HTML code that the online system 100 provides to the third party system 105 to be added to its web pages. For example, a tracking pixel is a transparent 1×1 image, an iframe, or other suitable object. When a user's browser 175 requests the content of a page having the tracking pixel, the HTML code makes a server call to the online system 100, which returns a 1×1 transparent image (e.g., a GIF), and the server call also sends certain information about the user or the actions the user is taking to the online system 100. For example, it may send information about the actions the user was taking on the web page (e.g., putting a product in a shopping cart, completing a checkout process, browsing a product page, etc.), price of product a user looked at or purchased, a SKU number for the product, a color, style, type or size of the product, a timestamp, a user identifier for the user that is used by the third party system 105, among other data. In addition, when the server call is made to the online system 100, the online system 100 can request a cookie that was previously placed on the browser by the online system 100, from which the online system 100 can acquire information about the client device 102 and the browser 175, such as the Internet Protocol (IP) address of the client device 102, an online system user ID for the user, etc. If the browser 175 used to visit the website does not include a cookie previously set by the online system 100, a cookie is then set on the browser 175. If the browser 175 includes a cookie already, the online system 100 can access the cookie.

In one embodiment, the third party system 105 can allow the online system 100 access to a system cookie that stores information that the third party system 105 has about a user, browser, device, etc. (this may require user permission for this type of sharing). For example, if the third party system 105 is closely affiliated or owned by the online system 100 (e.g., INSTAGRAM™ and FACEBOOK™), the two parties may work together such that the server call to the online system domain results in a redirect of the user's browser to the third party system domain, and under the third party system domain, the third party system cookie can be requested from the browser 175 before the browser is directed back to the online system 100 resulting in the online system 100 having access to the third party system cookie. The third party system cookie may include the third party system's user identifier for the user, a browser ID, a client device ID, and other information the partner system tracks for the user, e.g., a user profile, and a profile photo. Thus, the online system 100 gains access to identifiers and behavioral information that are associated with the user from interactions between the user and the third party system.

In one embodiment, a user logs into an account on the online system 100 to access a personalized set of web pages, such as a user profile page and a newsfeed page, using a browser 175. When a user logs in to its account with the online system 100, the online system 100 writes one or more cookies to the client device 102, such as to the browser 175, identifying the user and the browser. For example, a cookie including a user identifier associated with the user by online system 100 is stored and a cookie including a browser identifier is stored by the client device 102; the cookie including the browser identifier may include data identifying a browser type. While the user is logged in to the online system 100 using the browser 175, the cookie including the user identifier is stored by the browser 175. The cookie including the browser identifier is stored until it is deleted by the user or deleted by the browser 175. In one embodiment, users may opt out of receiving cookies from the online 100 to prevent the online system 110 from storing cookies using the browser 175.

The online system 100 receives image data of a user of the third party system 105, e.g., profile images of the user, and textual information describing the user, from the third party system 105, and predicts demographic information, e.g., age, gender and interests, of the user based on the received data of the user. In one embodiment, the user of the third party system 105 has a corresponding user profile on the online system 100. Example embodiments matching a user across multiple online systems based on image data and textual data associated with the user are further described in U.S. patent application Ser. No. 15/497,454, filed on Apr. 26, 2017, which is hereby incorporated by reference in its entirety. The predictions for the user of the third party system 105 can be used to build more information about the corresponding user in the online system 100, e.g., building a comprehensive user profile for the user, and to provide more relevant content to the user on the online system 100.

In various embodiments, the online system 100 includes a user profile store 140, a training data store 145, an action logger 115, a machine learning module 120, a prediction model 130, and an image/text/correlation (ITC) based prediction module 135. In the embodiment shown in FIG. 1, the prediction model 130 includes an image analysis model 131, a text analysis model 132, and a correlation model 133. In alternative configurations, different and/or additional entities may also be included in the online system 100.

The online system 100 maintains user profiles associated with users of the online system 100 in the user profile store 140, each user profile identified by a user ID and associated with a user of the online system 100. A user profile of a user of the online system 100 may include declarative information about the user that was explicitly shared by the user and may also include profile information inferred by the online system 100. In one embodiment, a user profile includes multiple data fields, each describing one or more attributes of the corresponding user of the online system 100. Examples of information stored in a user profile include biographic, demographic, and other types of descriptive information, such as work experience, educational history, age, gender, hobbies or preferences, location and the like. A user profile may also store other information provided by the user, for example, profile images. In certain embodiments, a profile image of a user may be tagged with identification information of the user of the online system 100 displayed in an image. The user profile store associated with the online system 100 further stores data describing one or more relationships between different users and allows users to specify their relationships with other users within the online system 100.

For each user of the online system 100, the user profile can be bundled together into a comprehensive user profile with other user information that is associated with the same user across multiple online systems, e.g., the third party system 105. The other user information can be received by the online system 100 from the client device 102, or the third party system 105 (e.g., through the network 110).

The action logger 115 identifies interactions of users internal and external to the online system 100. User interactions internal to the online system 100 include interactions between users, interactions between a user and a page within the online system 100, interactions between a user and a post on a page. Examples of actions include adding a connection to another user, sending a message to another user, uploading an image, reading a message from another user, viewing content associated with another user, attending an event posted by another user, among others. These interactions may be stored as an association (e.g. an edge in a social graph) between the user (e.g. a first node in the social graph) and the entity that the user interacted with (e.g. a second node in the social graph).

The action logger 115 may be used by the online system 100 to track user actions on the online system 100, as well as actions on third party systems 105 that communicate information to the online system 100. Users may interact with various objects on the online system 100, and the action logger 115 stores information describing these interactions in an action log. Examples of interactions with objects include: commenting on posts, sharing links, and checking-in to physical locations via a mobile device, accessing content items, and any other interactions. Additional examples of interactions with objects on the online system 100 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log records a user's interactions with sponsored content on the online system 100 as well as with other applications operating on the online system 100. In some embodiments, data from the action log is used to infer interests or preferences of a user, augmenting the interests included in the user's user profile and allowing a more complete understanding of user preferences.

User interactions with a page outside the online system 100 include sharing photos and videos on a visual storytelling service hosted by a third party system 105, purchasing or reviewing a product or service using an online marketplace hosted by a third party system 105, registering with or subscribing to a website hosted by a third party system 105, requesting information from a third party system 105, and other similar actions. These interactions may be previously stored as a cookie on a browser 175 accessed by the user and subsequently provided to the online system 100. When an action is taken on and/or off the online system 100, an entry for the action is generated by the action logger 115 and associated with the user's user profile. Furthermore, a timestamp of each interaction is also logged by the action logger 115.

The machine learning module 120 trains one or more models, e.g., the image analysis model 131, the text analysis model 132, and the correlation model 133, using features based on training data from the training data 145. The machine learning module 120 can store the trained models 131, 132 and 133 in the online system 100 and periodically re-train the models using features based on updated training data. Example features include image features and textual features associated with users of the online system 100. In some embodiments, the training data store 145 includes predetermined information about a population of users of the online system 100 provided to the online system 100 or from another module of the online system 100, e.g., the action logger 115 or user profile store 140.

In one embodiment, the machine learning module 120 retrieves training data from the training data store 145 and extracts image features from the training data. The machine learning module 120 trains the image analysis model 131 of the prediction model 130 using the extracted image features. The training data includes information about users of the online system 100, and information about users of the third party system 105. Examples of information about users of the online system 100 include profile photos of users of the online system 100, photos posted by the users of the online system 100, and photos posted by other users who are socially connected with a user within the online system 100 that are viewed, commented on or shared by the user. Examples of information about users of the third party system 105 include photos posted by users of the third party system 105.

In one embodiment, the machine learning module 120 trains the image analysis model 131 to recognize subject matter in content based on visual attributes of the content. Content may include, for example, profile images and descriptive information of users of various online systems. A visual attribute may include a visual pattern in an image or an image segment reflecting a characteristic property of subject matter depicted in content. Visual attributes may be based on one or a combination of, for example, appearance, color, shape, layout, and the like. For example, the extracted image features from the training data are visual features of human faces commonly used in user profile photos. The machine learning module 120 trains the image analysis model 131 to recognize human faces in image data using facial recognition algorithm to identify human faces.

In some embodiments, the image analysis model 131 is an image classifier trained by the machine learning module 120 to recognize visual attributes of an image class based on contextual cues gathered from a sample set of images selected from the training data stored in the training data store 145. The sample set of images may include a large enough number of images to ensure an accurate outcome by the classifier. The classifier may assign each item of content a statistical score corresponding to the extent the content falls within a particular image class. In some embodiments, the classifier may incorporate a hierarchical classifier, a linear classifier, or other classifier. In some embodiments, the classifier may be trained initially based on a selected subset of images maintained by the online system 100. The classifier may be retrained under various circumstances. For example, the classifier may be retrained periodically at a selected frequency or non-periodically as images are made available to the classifier. As another example, the classifier may be retrained upon the occurrence of certain events, such as events (e.g., the Super Bowl) that are likely to cause a large number of images to be uploaded to the online system 100. As yet another example, the classifier may be retrained when the online system 100 receives a threshold number of new images. Retraining in these and other circumstances can refine the ability of the classifier to recognize visual attributes of image classes.

An image class may include, for example, objects (e.g., a cat, car, person, purse, etc.), human body parts (e.g., beard, faces), brands or objects associated with brands (e.g., Coca-Cola®, Ferrari®), professional sports teams (e.g., the Golden State Warriors®, the San Francisco Giants®), locations or places of interest (e.g., Mount Everest), plants, (e.g., various types of orchids), structures (e.g., skyscrapers, bridges, houses), vehicles (e.g., airplanes, bicycles, cars, motorcycles), activities (e.g., swimming), phrases or concepts (e.g., a red dress, happiness), and any other thing, action, or notion that can be associated with content. While many examples provided herein may refer to a single "image class," it is noted that the image class may refer to a plurality of image classes or one or more image classes comprising an amalgamation of objects, brands, professional sports teams, locations, etc. Each image class has multiples sets of image features commonly associated with that image class, e.g., distinct visual features associated male human faces.

In some embodiment, the machine learning module 120 also trains the image analysis model 131 to differentiate two images by comparing the two images in a selected representation space. In one embodiment, the machine learning module 120 trains the image analysis model 131 to compare images represented in corresponding color histograms and to measure dissimilarity between the histograms of two images in a variety of distance measure, e.g., $\chi 2$ statistics. In another embodiment, the machine learning module 120 trains the image analysis model 131 to compare images represented in a continuous probabilistic framework based on a mixture of Gaussians models and to measure dissimilarity between two images in terms of KL-divergence.

In one embodiment, the machine learning module 120 retrieves training data from the training data store 145 and extracts textual features from the training data. The machine learning module 120 trains the text analysis model 132 using the extracted textual features. Examples of textual features include descriptive text about users of the online system 100, and descriptive text about users of the third party system 105. Descriptive text about a user of an online system may include biographic, demographic, and other types of descriptive information, such as work experience, educational history, gender, hobbies or preferences, location and the like. In one embodiment, the descriptive text about a population of users of the online system 100 and the third party system 105 are from corresponding user profiles and are provided to the online system 100.

In one embodiment, the machine learning module 120 trains the text analysis model 132 to recognize textual cues of subject matter in content. A textual cue may include a nonvisual indicator of the subject matter in content, e.g., tagged description of a user in his/her user profile. Examples of textual cues include a descriptive tag, global positioning system (GPS) coordinates of a profile image, the identity of a tagger of the content, the identity of an uploader of the content, metadata associated with the content, identifies of people who view or like the given type of content, Exchange Image File (EXIF) information, etc. The machine learning module 120 trains the text analysis model 132 to recognize textual cues of subject matter in content using a variety of deep learning techniques, e.g., natural language processing techniques on body of texts or subtexts of user online profiles to determine keywords, phrases, or hashtags, and the like, that frequently appear in user online profiles.

The text analysis module can also analyze other types of text associated with a user, such as text related to user actions. For example, a user may post content on a social networking or other online system, and this content may include text written by the user to describe what the user is currently doing, where the user is in a photo posted, or any other description about the user. The text analysis module can also learn to recognize textual cues in these posts by the user that provide profile type information about the user, such as an indication that the user has in interest in travels likes music, hangs out with people in the 20's, hangs out mostly with women, etc. The text analysis module can also analyze other information associated with a user post, such as textual comments by other users on the system and textual replies by the user to those comments. Similarly, on a social networking system, the user may be connected to various other users, and those user's data can provide information about the user that might be relevant for building the user's profile, and so those connections' profiles, posts, comments, replies, etc. can also be analyzed. For example, if many of the user's friends are hockey fans, the user is more likely to be interested in hockey, and if the user regularly interacts on the online system with other users who are in their 30s, the user is likely in this age bracket. All of these various types of user activity information can be stored by the online system for the user and can be used in building a back-end profile for the user that only the system itself sees, rather than a forward-facing profile that is shared with other users. The models learn from this textual data what data is valuable in building a user data profile.

In some embodiment, the machine learning module 120 also trains the text analysis model 132 to differentiate two texts by comparing the two texts. In one embodiment, the machine learning module 120 trains the text analysis model 132 to compare texts based on keywords associated with the texts and to measure similarity between two texts. Example measures of similarity include cosine similarity or the generalized Euclidean distance between the vectors associated with the keywords of two texts.

In one embodiment, the machine learning module 120 also trains a correlation model 133 to identify and select contextual cues that correspond to an image class. In various embodiments, the trained correlation model 133 may evaluate the attributes of a particular image class and may determine whether certain contextual cues are likely associated with that image class. For example, the correlation model 133 may determine that one type of tags is likely to accompany a photo of a domestic housecat, while another type of tags is likely to accompany a photo of a user in a Catwoman costume on Halloween. In such a case, the trained correlation model 133 may select the type of tags that is likely to accompany a photo of a domestic housecat to correspond to the image class of a cat. Consideration of whether contextual cues apply to a particular image class may be based on many considerations, such as tags (e.g., the tag "#cat", the tag "#Halloween", etc.), the order of tags, whether particular tags are accompanied by other particular tags (e.g., whether the tag "#cat" is accompanied by the tag "#animal" or whether the tag "#cat" is accompanied by the tag "#Halloween"), etc. The trained correlation model 133 may also be configured to rank and/or score the extent that the contextual cues associated with a particular image correspond to a particular image class.

In some embodiments, the machine learning module 120 trains the correlation model 133 to analyze the syntax of image tags of the sample set of images. The trained correlation model 133 may determine how likely a specific syntax correlates with a given image class. In some embodiments, syntactical analysis of the image tags may involve assigning weights to the exact language of the image tags. That is, the trained correlation model 133 may determine that the exact wording of tags associated with an image indicates that the tags should be correlated with an image class. For instance, an image may be tagged with the image tag "#domestic housecat." The trained correlation model 133 may determine that a tag "#domestic housecat" correlates to a high degree with an image class for images of domestic housecats. As another example, the trained correlation model 133 may determine that a tag "#domestic house market" correlates to a low degree with the image class for domestic housecats.

In some embodiments, the machine learning module 120 also trains the correlation model 133 to analyze social cues that indicate the status or a profile of a person in an online system. The person may be a generator and/or tagger of a particular image of the sample set of images. For instance, the trained correlation model 133 may determine, based on the person's activities (e.g., past posts, status updates, friendships, messaging history, past tagging history, past image generating/browsing/commenting/sharing history, web browsing history, online profile, etc.), or relationships (e.g., friends), whether the person is likely to be associated with an image class. The trained correlation model 133 may assign various scores to one or more images based on the person's activities associated with the sample set of images.

The ITC based prediction module 135 uses the trained image analysis model 131, the text analysis model 132 and the correlation model 133 of the prediction model 130 to predict demographics, e.g., age, gender and interests, based on the image data and text data associated with the user. For example, the ITC based prediction module 135 uses the trained image analysis model 131 of the prediction model 130 to recognize one or more visual patterns in images about the user and classify the images into their corresponding image classes. Based on features associated with the image classification, the ITC based prediction module 135 selects features related to demographics of the user, and predicts the age, gender and interests of the user based on the selected features. For example, the ITC based prediction module 135 uses the trained image analysis model 131 to compare visual attributes of the images of the user with visual attributes of an image class and to determine whether visual attributes in the images of the user can be sufficiently correlated with visual attributes of the image class.

The ITC based prediction module 135 uses the trained text analysis model 132 of the prediction model 130 to analyze text data associated with a user and identify textual cures related to the user's demographic information such as age, gender and personal interests. For example, the ITC based prediction module 135 analyzes user profiles and online activities associated with the user, e.g., action logs recorded by the action logger 115, and predicts the user's age, gender and interests based on the analysis.

The ITC based prediction module 135 may also use the correlation model 133 of the prediction model 130 to analyze the contextual cues associated with images of a user. For example, the ITC based prediction module 135 users the trained correlation model 133 to analyze the syntax of image tags of the images of the user. The trained correlation model 133 may determine how likely a specific syntax correlates with a given image class. For example, the trained correlation model 133 may determine that the exact wording of tags associated with an image indicates that the tags should be correlated with an image class.

Based on the image features, textual cues and correlation between the image features and textual cues associated with images of a user obtained by the trained image analysis model 124, the text analysis model 132 and the correlation model 133, the ITC based prediction module 135 predicts demographics of the user, e.g., age, gender and interests. For example, the ITC based prediction module 135 uses the trained image analysis model 131 to classify a photo of a Ferrari® driven by the user into an image class of cars, or an image class of human faces. The ITC based prediction module 135 similarly analyzes each image associated with the user, e.g., photos posted by the user, and photos posted by other users who are socially connected with the user that are viewed, commented on or shared by the user. Based on selected visual features associated with the image classes of the images of the user, the ITC based prediction module 135 predicts demographics about the user, e.g., a male between age 30-40 having a strong interest in cars. The ITC based prediction module 135 takes the visual features of images of a user, textual features associated with the user, and correlations between the image features and textual features to predict demographic information of the user such as the user's age, gender and interests.

Figure 2A:
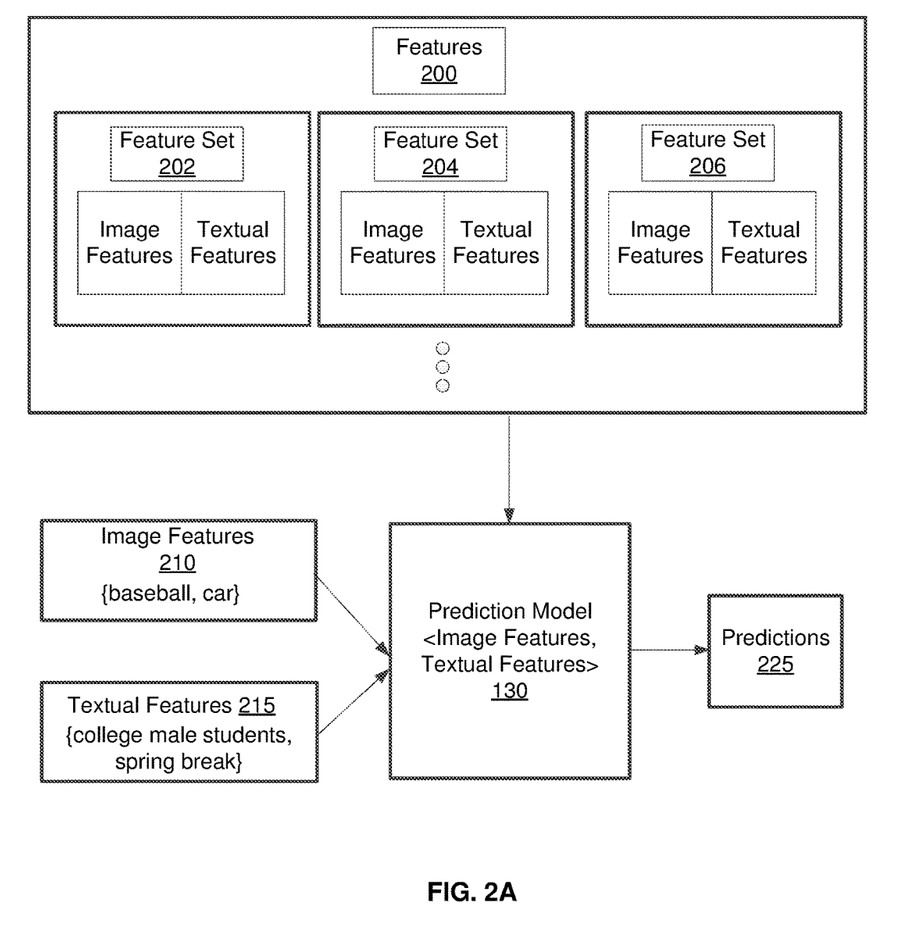
FIG. 2A is a data flow diagram for training a prediction model, in accordance with an embodiment.

Turning now to FIG. 2A, FIG. 2A is a data flow diagram for training the prediction model 130, in accordance with one embodiment. The machine learning module 120 retrieves training data from the training data store 145 and extracts features 200 from the training data. The machine learning module 120 trains the prediction model 130 using the features 200. The training data includes information about users of the online system 100. The features 200 include one or more feature sets, e.g., feature sets 202, 204, and 206. Each feature set includes a set of image features and a set of textual features. Though only three feature sets are shown in FIG. 2A, in practice, the machine learning module 120 trains the prediction model 130 using many more feature sets, for example, including hundreds of different user features and thousands of different creative features.

The prediction model 130 has an image analysis model 131, a text analysis model 132 and a correlation model 133 for training. In the example shown in FIG. 2A, the prediction model 130 takes as input image features 210 and textual features 215 and outputs predictions of demographics of users in the training data. The image features 210 describe an image of a target user, whose demographics is to be predicted. The textual features 215 are textual descriptions of the target user. Based on the input, the prediction model 130 generates a prediction of the demographic information of the target user. For instance, the image features 210 of the images associated with the target user depict a male user swinging a baseball bat in a photo and driving a Ferrari® by himself or with his friends in other photos, and text features 215 describing activities of a known population of college male students during their spring break, e.g., watching San Francisco Giants® baseball games near Fisherman's Wharf. Based on features from previous training data, the prediction model 130 determines that college aged male users have a strong interests for baseball, and that the target user is likely to behave similarly as the college aged male users. Thus, the prediction model 130 predicts that the target user is a male between 20-30 years old, and is likely interested in sports in general, and in baseball and cars in particular.

To generate features to train the prediction model 130, the machine learning module 120 can compare the extracted information from image data and text data associated with a target user with other extracted information from reference/sample image data and text data associated with users included in the training data. For example, the reference image data include reference images, and the extracted information from the reference images indicates that the reference images include, on average, two to five people (e.g., a photo of people socializing at a birthday party) identified by the image analysis model 132 using a human face or eye detection algorithm to identify the number of people in the reference images. The prediction model 130 determines that if the extracted information associated with images of a target user indicates that the images also includes two to five people (similar to the reference images), then the target user has similar demographic traits as those associated with the people shown in the reference images. To train the text analysis model 132 of the prediction model 130, the machine learning module 120 uses a similar process to generate textual features. For example, the machine learning module 120 uses natural language processing techniques on body of texts or creative subtexts to determine keywords, phrases, or hashtags, and the like, that frequently appear in content items that are popular among a group of target users.

Figure 2B:
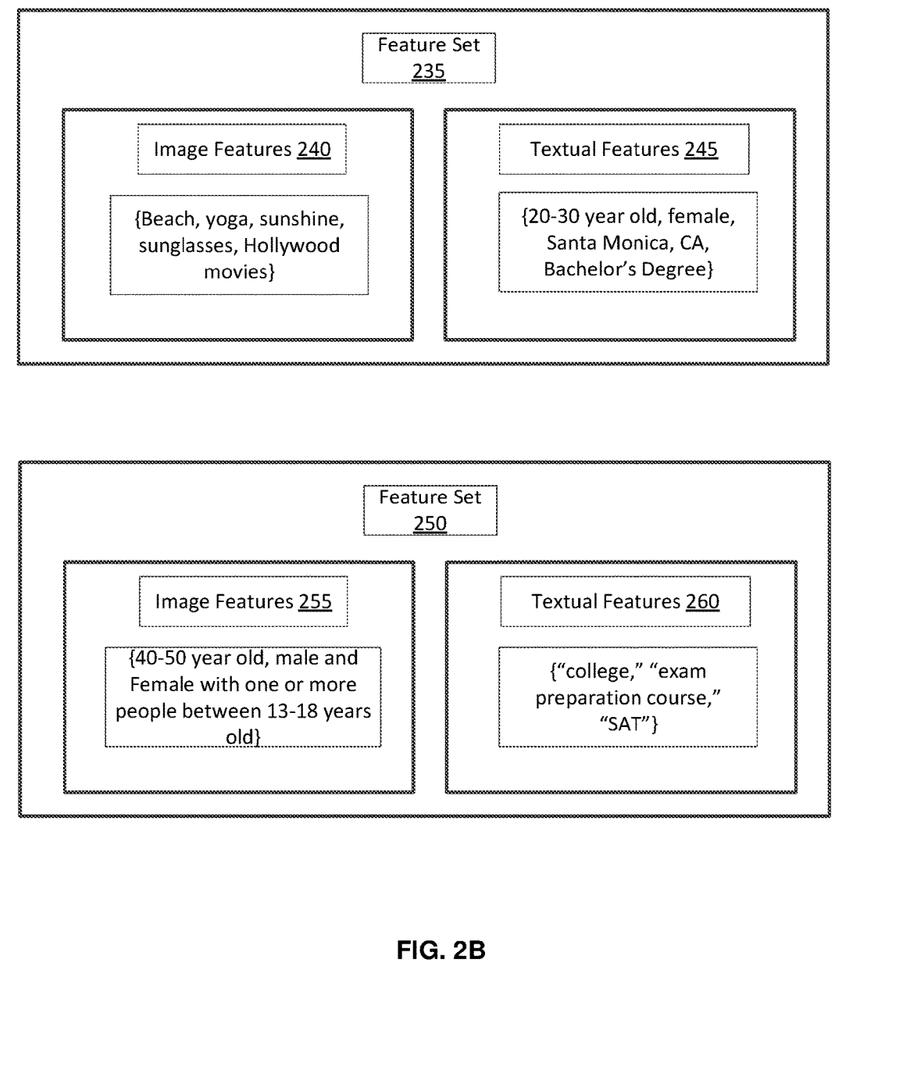
FIG. 2B is a diagram of feature sets for training the prediction model, in accordance with an embodiment.

FIG. 2B is a diagram of feature sets for training the prediction model 130 according to one embodiment. Feature set 235 includes image features 240 and textual features 245. The image features 240 include visual features associated with images of a beach, yoga, sunshine, sunglasses, or Hollywood movies. The textual features 245 include texts describing a group of users who are 20-30 year old females in Santa Monica, Calif. and earned a Bachelor's degree. The prediction model 130 is likely to predict that the target users (i.e., the 20-30 year old females in Santa Monica) have a strong affinity for the visiting the beach, performing yoga, going outdoors in the sunshine, purchasing sunglasses, or watching Hollywood movies.

Feature set 250 includes image features 255 and textual features 260. The image features 255 include visual features strongly associated with a group of users who are 40-50 year old males and females with at least one person between 13-18 years old, e.g., visual features extracted from a user's family portraits, holiday party pictures, and pictures of the user's family ski trips. The textual features 260 indicate that the group of users frequently interacts with content items having the keywords "college," "exam preparation course," and/or "SAT." The prediction model 130 predicts that the group of users is likely interested in helping the 13-18 years old find exam preparation courses to study for the SAT exam and apply for college.

Figure 3:
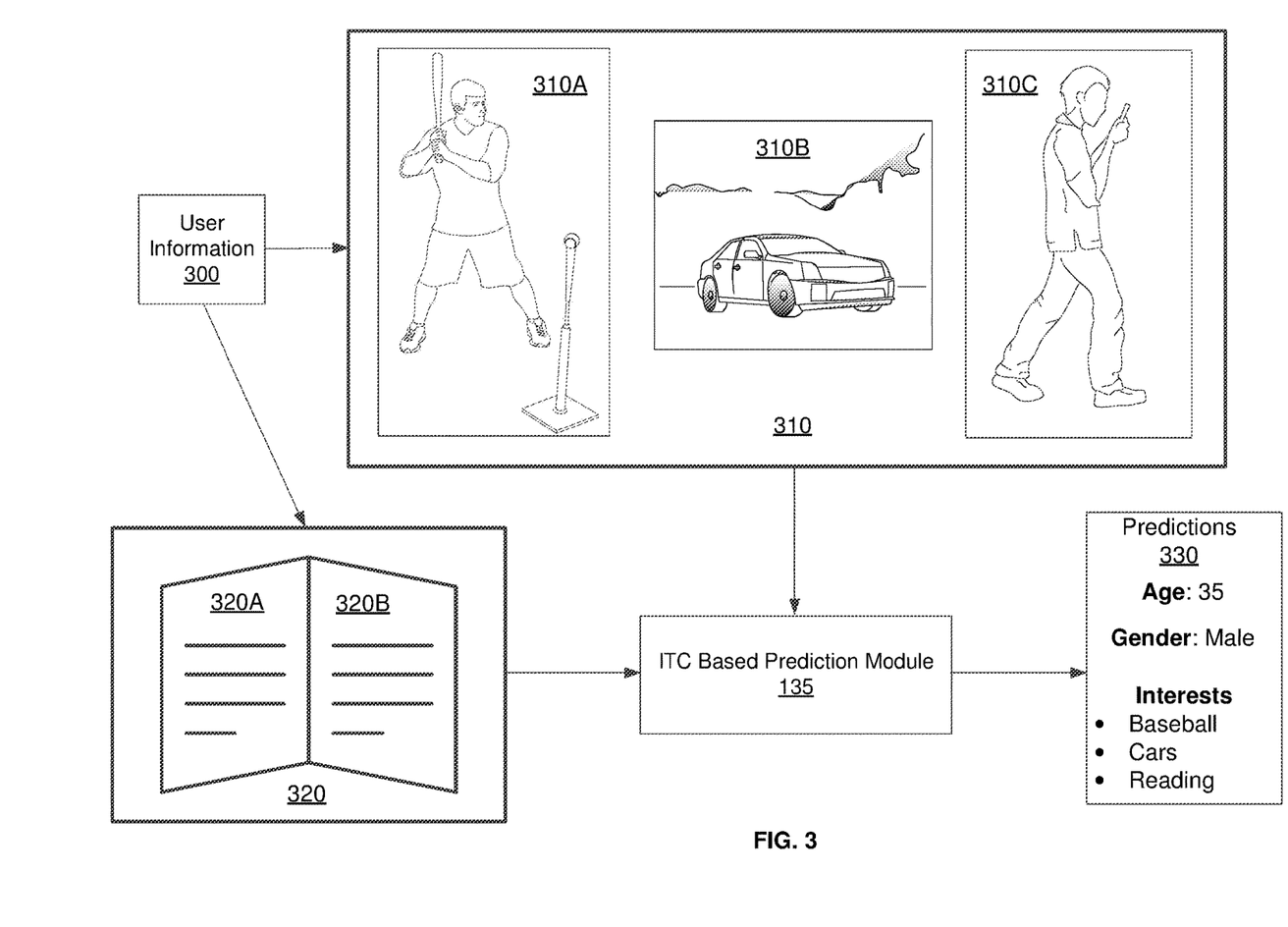
FIG. 3 is an example of predicting demographics of a user by a trained prediction model, in accordance with an embodiment.

FIG. 3 is an example of predicting demographic information of a user by the ITC based prediction module 135 using the trained prediction model 130, in accordance with an embodiment. In the example illustrated in FIG. 3, the ITC based prediction module 135 receives user information 300, which includes image data 310 of the user and textual information 320 describing the user. The image data 310 includes three images, images 310A, 310B and 310C, associated with a user of an online system, e.g., a user of INSTAGRAM™. The images 310A-310C may be posted by the user himself, or posted by others users who are socially connected with the user, where the user may have viewed, commented on or shared these images with others, such as his connections on the online system 100. Image 310A shows the user swinging a baseball bat during a training session; image 310B shows a car picture posted by the user; and image 310C shows the user browsing his phone while walking in a shopping mall, which was captured and posted by his mom. Each of the images 310A-310C is classified into its respective image class by the trained image analysis model 131, and has a set of visual features describing the image, such as facial features, body parts, electronics (i.e., the phone), vehicles (i.e., the car), and actions and sports (i.e., baseball and baseball swings). The images features associated with the images 310A-310C are provided to the ITC based prediction module 135 for predicting the demographic information, e.g., age, gender and interests, of the user.

Additionally, the ITC based prediction module 135 receives textual features associated with texts 320 describing the user, e.g., textual description extracted from the user's profile, contextual cues (e.g., tag information) describing the images 310A-310C, and social cues that describe the user's social connections within INSTAGRAM™ and/or within the online system 100.

Based on visual features associated with the images 310A-310C and the textual features of the texts 320 describing the user, the ITC based prediction module 135 predicts the demographic information of the user 330, including age (35), gender (male), and interests (baseball, cars, and reading). The ITC based prediction module 135 provides the predictions to the online system 100, which updates the user profile associated with the user within the online system 100, and selects content items for display to the user based on the predictions. The selected content items are more likely more suitable to the user and have a higher click through rate by the user.

Figure 4:
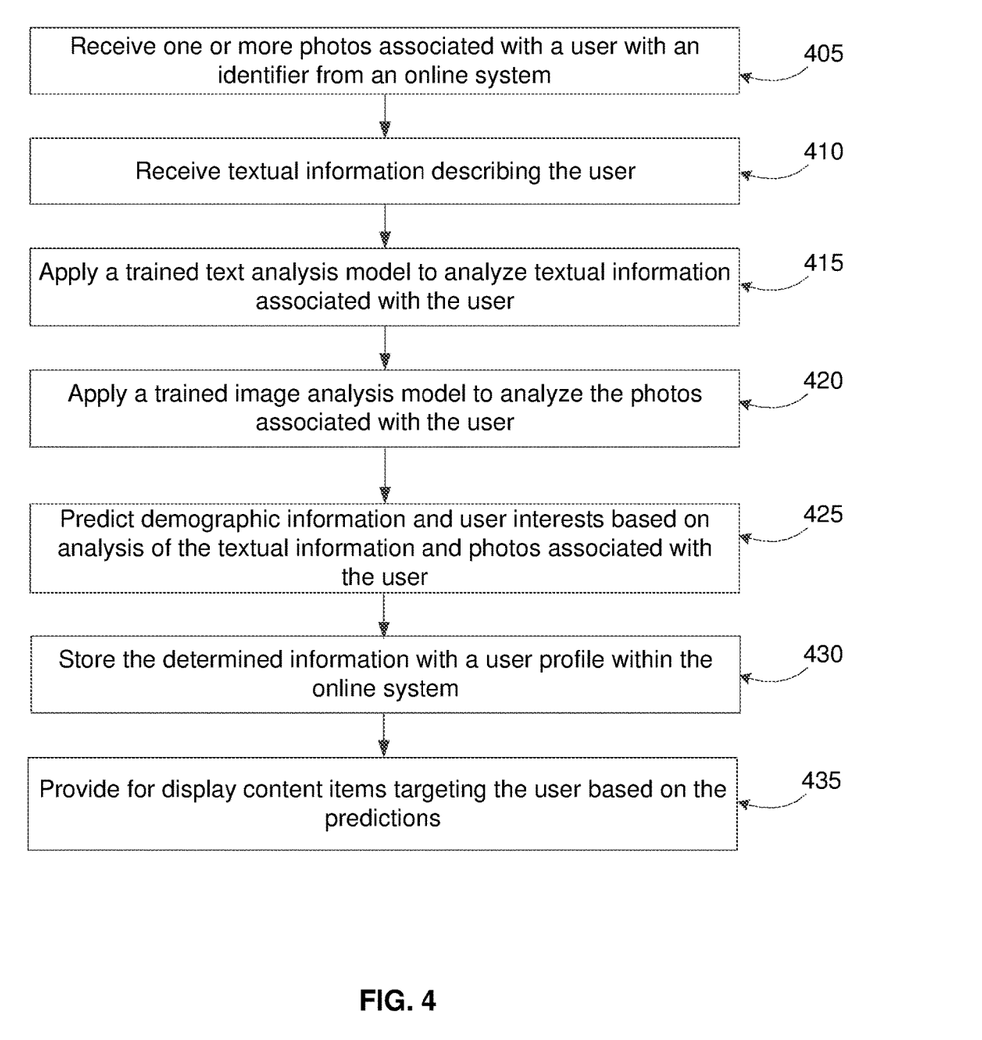
FIG. 4 illustrates a flowchart of predicting demographics of a user based on image data and text data associated with the user, in accordance with an embodiment.

FIG. 4 illustrates a flowchart of predicting demographic information of a user based on image data and text data associated with the user, in accordance with an embodiment. Initially, the online system 100 receives 405 one or more photos associated with a user with an identifier from a third party system 105, e.g., INSTAGRAM™. The online system 100 receives 410 descriptive text describing the user, e.g., textual description of the user extracted from the user's profile or tagging information associated with the photos of the user. The online system 100 applies 415 a trained text analysis model, e.g., the text analysis model 132, to analyze the textual information describing the user. The analysis results are represented by one or more textual features associated with the user.

The online system 100 applies 420 a trained image analysis model, e.g., the image analysis model 131, to the photos of the user. The analysis results are represented by one or more visual features associated with the user. The online system 100 may also apply a trained correlation model, e.g., the correlation model 133, to the photos and text data of the user to infer correlations between the photos and the text data associated with the user. Based on the analysis of the image features and textual features of the user, the online system 100 predicts 425 the demographic information of the user, e.g., age, gender and interests, and stores 430 the predictions associated with a user profile within the online system 100, and provides 435 for display content items targeting the user based on the predictions.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, by an online system, one or more photos associated with a user, each of the received photos including one or more visual features associated with the user;
   receiving, by the online system, textual information describing the user and related to activities conducted by the user on the online system;

applying a trained image analysis model to the received one or more photos of the user to generate a plurality of visual features related to the demographics of the user;

applying a trained text analysis model to the textual information for the user to generate a plurality of textual features related to demographics of the user;

applying a trained correlation model to the one or more photos of the user and to the textual information for the user;

generating a plurality of correlations between the visual features and the textual features, the correlations applying the textual features to determine whether the one or more photos belong to a particular image class that provides an indication of demographics of the user;

generating one more predictions of the demographics of the user based on the plurality of visual features, the plurality of textual features, and the plurality of correlations between the visual features and the textual features; and storing the generated predictions associated with a profile of the user within the online system for use in targeting content to the user based on the demographics predicted for the user.

2. The method of claim 1, wherein storing the generated predictions associated with a profile of the user within the online system comprises:

supplementing the profile of the user within the online system with the predicted demographics of the user; and generating a comprehensive profile of the user based on the supplementing of the profile of the user.

3. The method of claim 2, further comprising:

sharing the comprehensive profile of the user within the online system with another online system where the user has another profile.

4. The method of claim 1, further comprising:

selecting one or more content items for display to the user on the online system based on the predictions of the demographics of the user; and displaying the selected one or more content items to the user on the online system.

5. The method of claim 1, wherein the predictions of the demographics of the user include at least one of age of the user, gender of the user, and interests of the user.

6. The method of claim 1, wherein the image analysis model is trained based on a machine learning scheme associated with image processing on a corpus of image training data.

7. The method of claim 1, wherein the text analysis model is trained based on a machine learning scheme associated with natural language processing on a corpus of textual training data.

8. The method of claim 1, wherein the one or more photos of the user and the textual information describing the user are received from another online system that is separate and different from the online system.

9. A non-transitory computer-readable medium comprising computer program instructions, the computer program instructions when executed by a processor of a computer device causes the processor to perform the steps including:

receiving, by an online system, one or more photos associated with a user, each of the received photos including one or more visual features associated with the user;

receiving, by the online system, textual information describing the user and related to activities conducted by the user on the online system;

applying a trained image analysis model to the received one or more photos of the user to generate a plurality of visual features related to the demographics of the user;

applying a trained text analysis model to the textual information for the user to generate a plurality of textual features related to demographics of the user;

applying a trained correlation model to the one or more photos of the user and to the textual information for the user;

generating a plurality of correlations between the visual features and the textual features, the correlations applying the textual features to determine whether the one or more photos belong to a particular image class that provides an indication of demographics of the user;

generating one more predictions of the demographics of the user based on the plurality of visual features, the plurality of textual features, and the plurality of correlations between the visual features and the textual features; and storing the generated predictions associated with a profile of the user within the online system for use in targeting content to the user based on the demographics predicted for the user.

10. The non-transitory computer-readable storage medium of claim 9, wherein storing the generated predictions associated with a profile of the user within the online system comprises:

supplementing the profile of the user within the online system with the predicted demographics of the user; and generating a comprehensive profile of the user based on the supplementing of the profile of the user.

11. The non-transitory computer-readable storage medium of claim 10, further comprising computer program instructions, the computer program instructions when executed by a processor of a computer device causes the processor to perform the steps including:

sharing the comprehensive profile of the user within the online system with another online system where the user has another profile.

12. The non-transitory computer-readable storage medium of claim 9, further comprising computer program instructions, the computer program instructions when executed by a processor of a computer device causes the processor to perform the steps including:

selecting one or more content items for display to the user on the online system based on the predictions of the demographics of the user; and displaying the selected one or more content items to the user on the online system.

13. The non-transitory computer-readable storage medium of claim 9, wherein the predictions of the demographics of the user include at least one of age of the user, gender of the user, and interests of the user.

14. The non-transitory computer-readable storage medium of claim 9, wherein the image analysis model is trained based on a machine learning scheme associated with image processing on a corpus of image training data.

15. The non-transitory computer-readable storage medium of claim 9, wherein the text analysis model is trained based on a machine learning scheme associated with natural language processing on a corpus of textual training data.

16. The non-transitory computer-readable storage medium of claim 9, wherein the one or more photos of the user and the textual information describing the user are received from another online system that is separate and different from the online system.

17. The method of claim 1, wherein the image analysis model, the text analysis model, and the correlation model are retrained by a machine learning scheme upon an influx of new images for the user.

18. The method of claim 1, wherein storing the generated predictions further comprises also storing the generated predictions in another online system, where the user has another profile, for use in targeting content to the user in the other online system based on the generated predictions.

19. The method of claim 18, further comprising:
   generating a comprehensive profile of the user that includes information from the profile in the other online system and includes information from the stored profile with the predicted demographics such that the online system and other online system can both target content to the user based on the comprehensive profile.

* * * * *

UNITED STATES PATENT AND TRADEMARK OFFICE
CERTIFICATE OF CORRECTION

PATENT NO. : 10,210,429 B2  
APPLICATION NO. : 15/497866  
DATED : February 19, 2019  
INVENTOR(S) : Chaochao Cai et al.

Page 1 of 1

It is certified that error appears in the above-identified patent and that said Letters Patent is hereby corrected as shown below:

In the Claims

Column 15, Line 17, Claim 1, delete "one more predictions" and insert -- one or more predictions --

Column 16, Line 19, Claim 9, delete "one more predictions" and insert -- one or more predictions --

Signed and Sealed this  
Eighth Day of October, 2019

Andrei Iancu  
*Director of the United States Patent and Trademark Office*